United States Patent [19]
Zenser

[11] 3,964,765
[45] *June 22, 1976

[54] BICYCLE

[75] Inventor: Darwin Zenser, El Monte, Calif.

[73] Assignee: Yamaha International Corporation, Buena Park, Calif.

[ * ] Notice: The portion of the term of this patent subsequent to Feb. 11, 1992, has been disclaimed.

[22] Filed: Nov. 15, 1974

[21] Appl. No.: 523,988

Related U.S. Application Data

[63] Continuation of Ser. No. 387,669, Aug. 13, 1973, Pat. No. 3,865,402.

[52] U.S. Cl. .............................. 280/276; 280/284; 280/286
[51] Int. Cl.² ......................................... B62M 3/00
[58] Field of Search ........... 280/283, 286, 275, 276, 280/277, 284

[56] References Cited
UNITED STATES PATENTS

| | | | |
|---|---|---|---|
| 2,513,170 | 6/1950 | Harding | 280/276 |
| 3,133,748 | 5/1964 | Gunnerson | 280/284 |
| 3,298,713 | 1/1967 | Plain | 280/284 |
| 3,753,578 | 8/1973 | Rupp | 280/276 |
| 3,865,402 | 2/1975 | Zenser | 280/276 |

FOREIGN PATENTS OR APPLICATIONS

| | | | |
|---|---|---|---|
| 82,081 | 6/1956 | Netherlands | 280/276 |

Primary Examiner—John J. Love
Attorney, Agent, or Firm—Lindenberg, Freilich, Wasserman, Rosen & Fernandez

[57] ABSTRACT

A bicycle with a frame suspended on the wheels by telescoping shock absorbers that permit large vertical movements of the wheels when they hit bumps without producing large vertical movements of the bicycle frame, so that pedaling can continue uninterrupted in traversing rough terrain.

1 Claim, 6 Drawing Figures

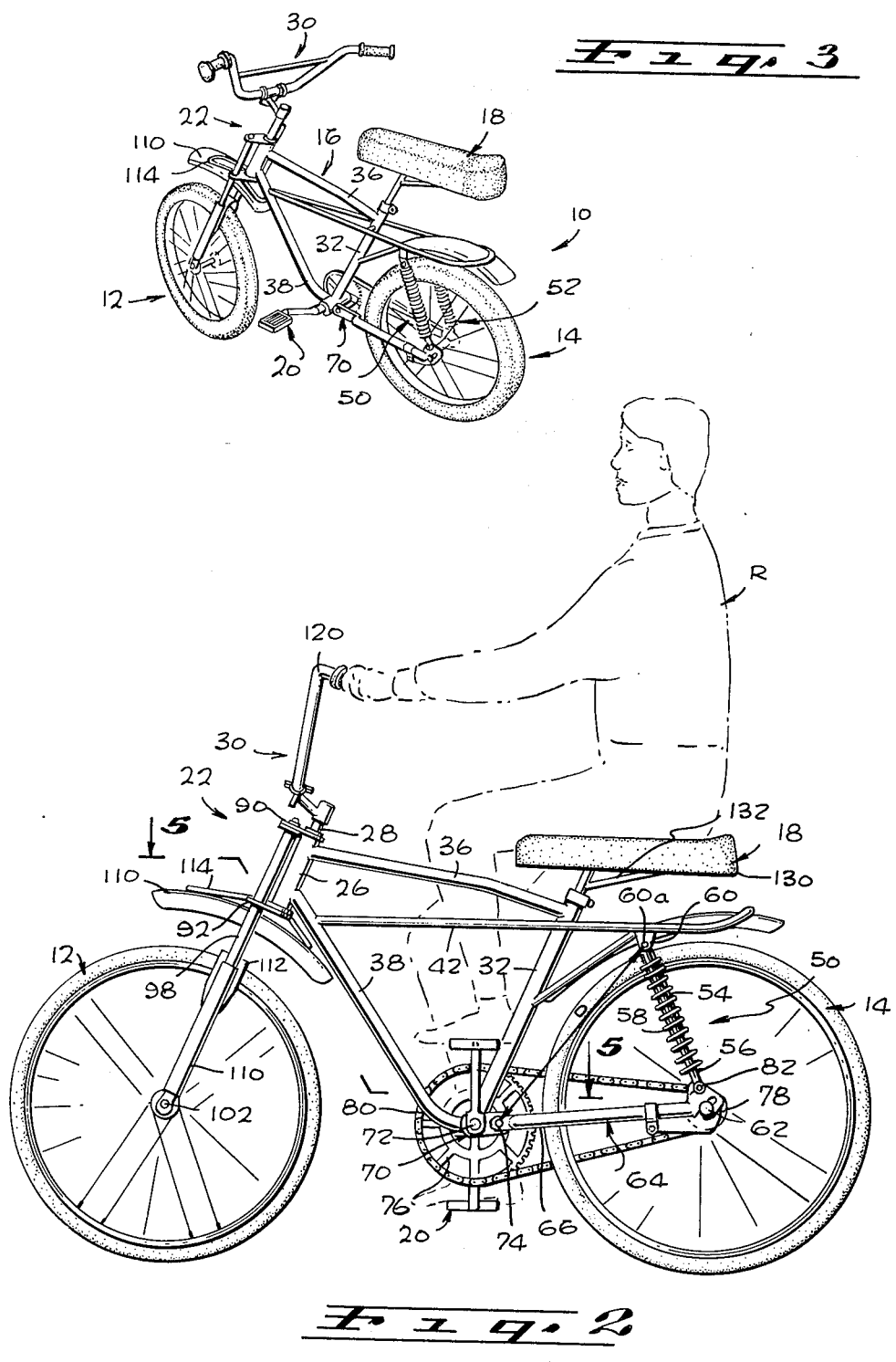

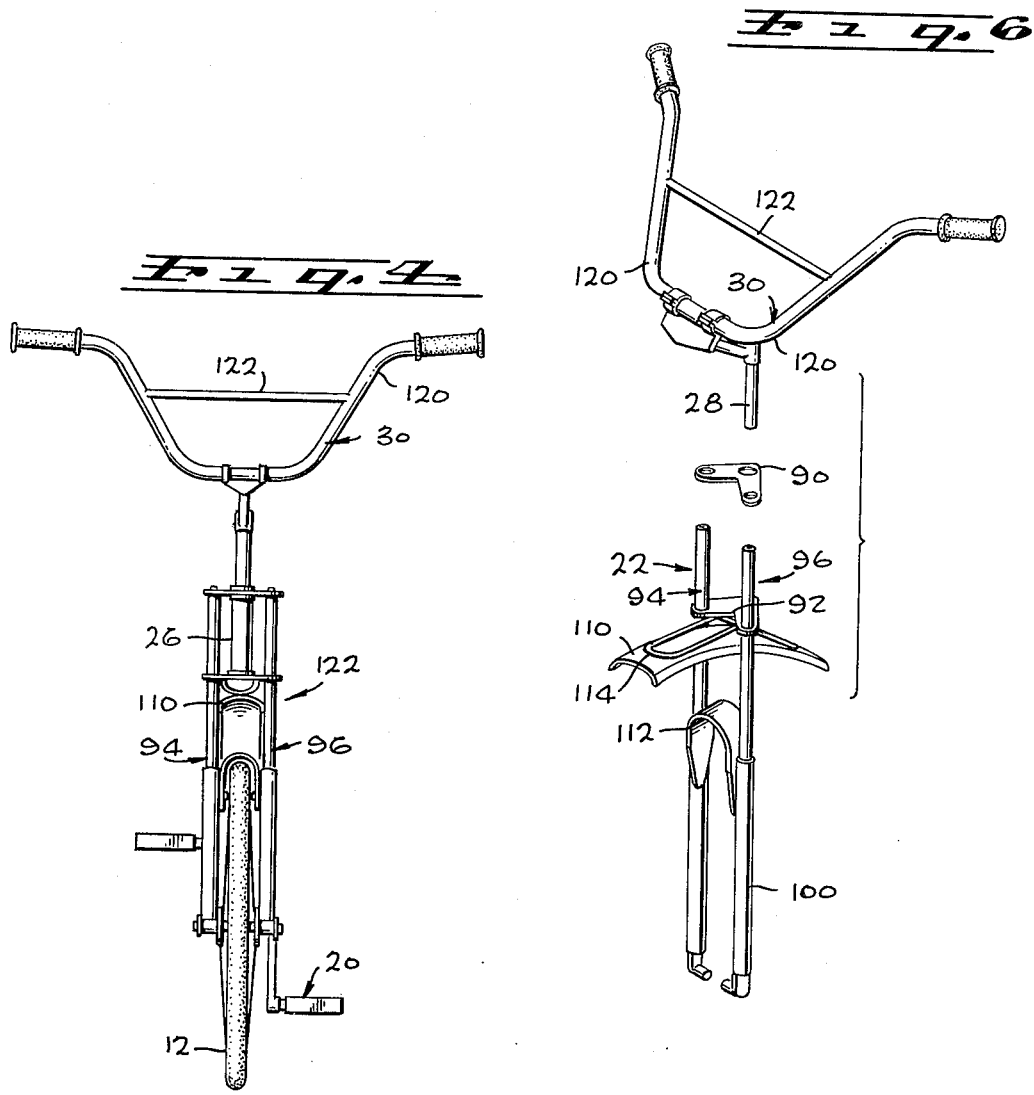

3,964,765

BICYCLE

This is a continuation of application Ser. No. 387,669, filed Aug. 13, 1973 now U.S. Pat. No. 3,865,402.

BACKGROUND OF THE INVENTION

This invention relates to bicycles that are propelled by foot pedals.

A sport which has become increasing popular is the racing of bicycles over rough terrain. It is often difficult to constantly pedal a bicycle as it is moving over very rough terrain because the large and irregular vertical movments of the bicycle frame tend to upset the balance of the rider and distract him from the application of pressure alternately to the pedals. Also, the large shocks transmitted to the frame tire the rider and lead to damage to the frame.

SUMMARY OF THE INVENTION

In accordance with one embodiment of the present invention, a bicycle is provided which has a frame suspended on the front and rear wheels in a manner that enables the absorption of large shocks by the wheels to minimize disruption of pedaling when traversing a rough terrain. The bicycle includes a swing arm with a forward end pivotally mounted on the frame, immediately behind the pedal shaft, and having a rear end which rotatably supports the rear wheel of the bicycle. The frame includes a pair of structural members extending over the rear wheel. A pair of telescoping shock absorbers connect each of the structural members to the rear end of the swing arm to permit large vertical movements of the rear end of the frame.

The front end of the frame is connected by a pair of telescoping shock absorbers to the front wheel. Two fender members lie over the front wheel. A lower one of the fender members closely surrounds the rim of the front wheel and connects together the lower tubes of the shock absorbers. The upper fender member lies high over the front wheel and is supported on the upper tubes of the shock absorbers. Accordingly, the upper fender member moves toward and away from the lower fender member when the rear wheel moves over a bump.

The novel features of the invention are set forth with particularity in the appended claims. The invention will best be understood from the following description when read in conjunction with the accompanying drawings.

BRIEF DESCRIPTION OF THE DRAWINGS

FIG. 2 is a side elevation view of the bicycle of FIG. 1;

FIG. 3 is a side, rear and upper perspective view of the bicycle of FIG. 1;

FIG. 4 is a front elevation view of the bicycle of FIG. 1;

FIG. 5 is a view taken on the line 5—5 of FIG. 2; and

FIG. 6 is an exploded view of a conversion kit containing parts of the bicycle of FIG. 1, for use in converting an ordinary bicycle to a bicycle having many features of the bicycle of FIG. 1.

DESCRIPTION OF THE PREFERRED EMBODIMENTS

Figure 1:
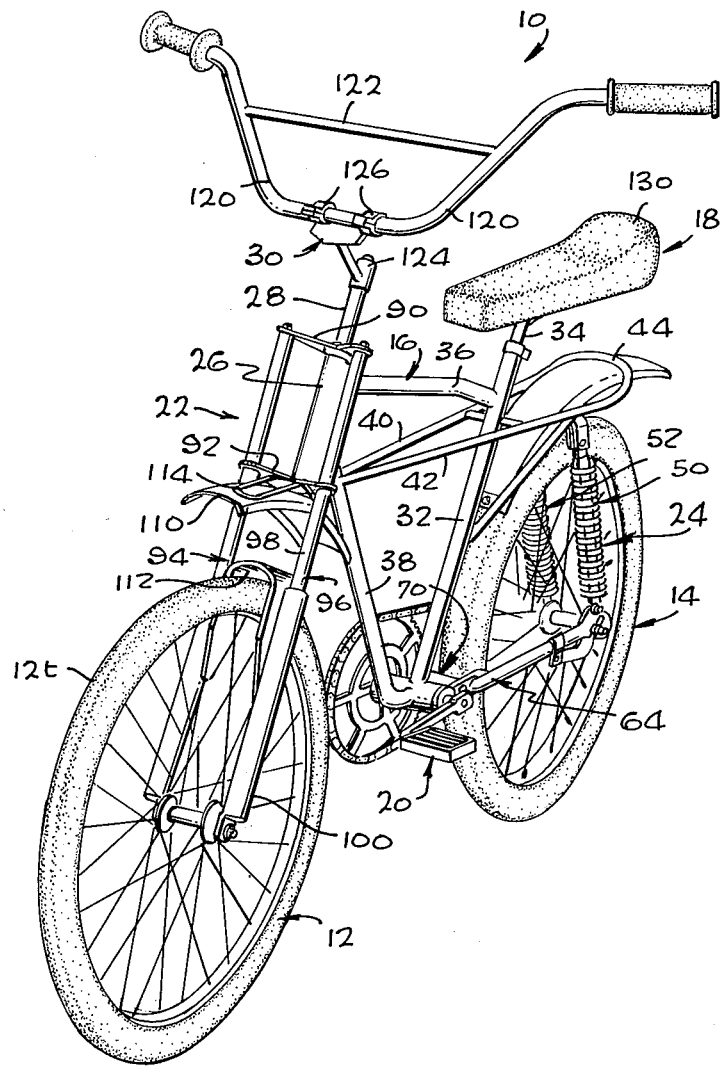
FIG. 1 is a perspective front and side view of a bicycle constructed in accordance with the invention.

FIG. 1 illustrates a bicycle 10 of the invention which includes front and rear wheels 12, 14, and a frame 16 which supports a seat assembly 18 that holds a rider R and a peddle assembly 20 which is utilized by the rider to drive the bicycle. Front and rear shock absorber assemblies 22, 24 support the frame on the wheels. The frame includes a tubular front member 26 for receiving the shaft 28 of a handlebar assembly 30, and a tubular rear member 32 for receiving a shaft 34 of the seat assembly 18. The front and rear members 26, 32 extend in a primarily vertical direction, and at an upward-rearward incline. An upper frame member 36 joins the tops of the vertical members 26, 32, while a bottom member 38 joins the lower ends of the vertical members 26, 32. The frame also includes a pair of elongated shockmount members 40, 42 which are supported near the top of the lower frame member 38 and rear vertical member 32. The shock-mount members extend behind the rear member 32 and are joined together at their rearward ends 44. The members 40, 42 serve to connect the rear shock absorber assembly 24 to the rear wheel 14.

Referring also to the other figures, it can be seen that the rear shock absorber assembly 24 includes two telescoping shock absorbers 50, 52, on opposite sides of the rear wheel, each having an upper tube 54, a lower bar or tube 56 which telescopes into the upper tube, and a compression spring 58 surrounding the tubes. The upper end of each upper tube 54 is pivotally joined to a bracket 60 which is mounted on one of the mount members 40 or 42, while the lower end of each lower tube 56 is coupled to the axle 62 of the rear wheel. The axle of the rear wheel is also connected to the frame through a swing arm 64. The swing arm 64 has a forward end 66 which is pivotally mounted on the frame 16 and has a rearward end 68 which is fastened to the rear axle 62. In the illustrated bicycle, the rear axle 62 is held in a slot at the rear of the swing arm 68, and the lower tube 56 of each shock absorber is attached to the rear end of the swing arm. The swing arm is bifurcated to provide a portion on each side of the rear wheel which is attached to the rear wheel and to a corresponding rear shock absorber.

The bicycle frame is provided with a multiple connection member 70 at the intersection of the rear and lower frame members 32, 38. The connection member 70 is welded or otherwise joined to the frame members 32, 38 to connect them. The member 70 also is formed with two bearing holes 72 and 74, the bearing hole 72 rotatably supporting the shaft of the pedal assembly 20, and the bearing hole 74 pivotally supporting the front end of the swing arm 64. The bicycle includes a transmission with a forward sprocket wheel 76 fixed to the pedal shaft, another sprocket wheel 78 at the rear wheel, and a chain 80 extending between them. The positioning of the pedal shaft 72 and swing arm shaft 74 close together results in maintenance of constant chain tension even as the rear wheel moves a considerable distance up and down. A minimum of binding of the upper and lower tubes 54, 56 of each rear shock absorber is assured by locating the attached point 60a at the upper bracket 60 a distance D from the forward swing arm bearing 74 which is approximately equal to the distance between the bearing 74 and the point 82 where the lower end of the rear shock absorber mounts on a swing arm. It may be noted that the bracket 60 is normally located behind the vertical frame member 32.

The forward shock absorber assembly 22 includes a pair of steering brackets 90, 92, which respectively lie at the top and bottom of the forward frame member 26, and which are both fixed to the steering shaft 28. The shock absorber assembly also includes two forward shock absorbers 94, 96, each having an upper tube 98, a lower tube 100 that slidingly receives the upper tube, and a spring (not shown) within the lower tube for urging the upper tube in an upward direction. The upper tube 98 is attached to both steering brackets 90, 92 so that the upper tube extends in a fixed direction from the frame, this being a downward and forward direction. The lower tube 100 has a lower end which supports the forward axle 102 on which the front wheel rotates.

The front end of the bicycle is provided with two fender members 110, 112. The upper fender member 110 is mounted by rods 114 on the lower steering bracket 92. The lower fender member 112 is mounted on the lower arms 100 of the two shock absorbers 94, 96. The upper fender member 110 can serve to prevent clothing items and the like from contacting the front wheel 12 and to prevent dirt from being thrown up from the tire. The upper member 110 moves towards and away from the lower fender member 112 when the front wheel hits a bump and moves up and down with respect to the frame. The distance between the upper and lower fender members 110, 112 is normally at least a few (three) inches, and greater than the widest tire 12t that can be received between the lower shock absorber tubes under the lower fender member. The lower fender member 112 can prevent the upper member 110 from bottoming on the front wheel 12 when the front wheel hits a severe bump. The lower member 112 also serves to tie the lower shock absorber tubes 100 together. The member 112 closely surrounds the tire 12t of the front wheel so that the member does not occupy a considerable height above the front wheel where it could interfere with vertical movements of the upper fender member.

The handlebar assembly 30 includes a tube forming a pair of handlebars 120 joined together by a handlebar brace 122. The handlebars are attached to the steering shaft 28 by a handlebar bracket 124. The bracket 124 has two widely spaced clamps 126 for holding the handlebars in place, to provide maximum stability. The seat assembly 18 includes an elongated seat 130 which is designed to hold a single rider, but to hold him comfortably. The seat is attached near its forward end to the upper end of the seat shaft 34, and is also braced by a bracing bar 132 which extends from the rear portion of the seat to the seat shaft 34.

The bicycle is designed to isolate the frame and rider from shocks that may be encountered in moving over large bumps. The bicycle can be utilized in ordinary street riding, but is especially useful in traversing rough terrain, as in the racing of bicycles on off-the-road paths which are uneven. The high degree of isolation of the rider from bumps in the road aids considerably in the pedaling of the bicycle, because the rider does not have to contend with constantly re-balancing himself while also trying to pedal. The suspension system is especially useful in a typical bicycle wherein the rider normally weighs more than the bicycle, the bicycle typically weighing less than 100 pounds. The middle of the seat 130 where the pedaling rider sits, lies over the rear wheel, so that there is a very high traction at the rear wheel, and therefore there is minimum slippage of the wheel on the ground when rapidly accelerating on a poor road. This type of weight distribution, with most of the weight over one wheel, could lead to a very hard ride for the rider. However, the telescoping suspension system, which permits the absorption of very large bumps, greatly reduces the severity of the ride so that good control and a good pedaling action can be continued when traversing a very rough terrain.

FIG. 6 illustrates components which form a conversion kit to convert the front portion of an ordinary bicycle, so that the front portion will be similar to that of the bicycle of FIG. 1. The conversion kit includes a handlebar assembly 30 including handlebars 120 and handlebar bracket 124 and also including a steering shaft 28. A shock absorber assembly 22 is also included, as well as a pair of steering brackets 90, 92. A child can convert the front end of a typical prior art bicycle by removing the steering shaft and handlebars as well as the frame portion that connects it to the front wheels, and replacing them by the apparatus of FIG. 6. The conversion not only greatly alters the appearance of the bicycle, but also greatly reduces shock at the front end thereof. This is useful for bicycles which are often ridden in a "wheely" type of maneuver wherein the front wheels are held off the ground while riding, and where the front wheels are than slammed down hard on the ground, the shock absorbing assembly serving to greatly cushion the shock of the front wheels falling back to the ground.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A bicycle comprising:
  front and rear wheels (12, 14) having axles;
  a frame (16) having forward and rearward ends, the forward end having a pair of front mount locations above the level of the front wheel axle and the rearward end having a pair of rear mount locations above the level of the rear wheel axle, the frame having a multiple connector (70) located between the wheels and forming a pedal bearing and a swing arm bearing, and the frame including a tubular rear frame member (32) extending upwardly and rearwardly from the multiple connector and a tubular lower frame member (38) extending forwardly and upwardly from the multiple connector, said multiple connector connecting said rear and lower frame members;
  a seat assembly (18) mounted on the frame for holding a rider, said seat assembly including a shaft (34) adjustably mounted in said tubular rear member and including a seat (130) at the top;
  a pedal assembly (20) rotatably mounted on the pedal bearing, for rotational driving by the rider;
  chain means (80) coupling the pedal assembly to the rear wheel;
  a swing arm (64) having a forward end pivotally mounted on the swing arm bearing and a rearward end rotatably connected to the rear wheel;
  a pair of telescoping rear shock absorbers (50, 52) connecting the rear mount locations of the frame to the rearward end of the swing arm;

a pair of telescoping front shock absorbers (94, 96) having upper portions connected to the front mount location of the frame and having lower portions rotatably coupled to the front wheel, said lower portions being of greater diameter than said upper portions and slideably receiving the lower ends of said upper portions;

the frame including a front member (26) coupled to the front end of the lower frame member and also including a pair of elongated shock-mount members (40, 42) extending rearwardly from a location near the front of the lower frame member, said mount members extending on opposite sides of the rear frame member and joined thereto and said mount members extending behind the rear frame member with each of said rear shock absorbers coupled to a different one of the mount members; and a rear fender mounted on the rear end of said mount members, said mount members joined together at their rearward ends (44), and their rearward ends angled upward to extend over said rear fender.

* * * * *